United States Patent [19]
Smithies et al.

[11] Patent Number: 5,818,955
[45] Date of Patent: *Oct. 6, 1998

[54] DOCUMENT AND SIGNATURE VERIFICATION SYSTEM AND METHOD

[75] Inventors: Christopher Paul Kenneth Smithies, Corfe Mullen; Jeremy Mark Newman, Frome, both of England

[73] Assignee: PenOp Limited, Somerset, England

[*] Notice: The term of this patent shall not extend beyond the expiration date of Pat. No. 5,544,255.

[21] Appl. No.: 859,626

[22] Filed: May 20, 1997

Related U.S. Application Data

[63] Continuation of Ser. No. 644,084, May 9, 1996, Pat. No. 5,647,017, which is a continuation of Ser. No. 298,991, Aug. 31, 1994, Pat. No. 5,544,255.

[51] Int. Cl.$^6$ ........................................ G06K 9/00
[52] U.S. Cl. ................... 382/115; 382/232; 340/825.34; 380/23
[58] Field of Search ................. 382/119, 120, 382/121, 122, 123, 232, 115, 116, 117, 118; 178/18; 340/825.3, 825.33, 825.34; 283/70, 75; 380/23

[56] References Cited

U.S. PATENT DOCUMENTS

| | | | |
|---|---|---|---|
| 3,806,704 | 4/1974 | Shinal | 235/61.78 |
| 4,202,626 | 5/1980 | Mayer, Jr. et al. | 355/52 |
| 4,323,729 | 4/1982 | Westermayer | 178/22.01 |

(List continued on next page.)

FOREIGN PATENT DOCUMENTS

| | | | |
|---|---|---|---|
| 95/16974 | 6/1995 | WIPO | G06K 9/00 |

OTHER PUBLICATIONS

"Pen–Op—Pen to Peer Biometric Security For Pen–Based Computing," 1991, Peripheral Vision Limited.
Dan Mezick, "Pen Computing Catches On," Oct. 1993, Byte, vol. 18, No. 11, p. 105.
Portia Isaacson, "Electronic Ink Emerges As A Launchpad of the Future—While Few Products Exist, Jot 1.0 Standard Is a Step," Jun. 28, 1993, Computer Reseller News, p. 62.
Ray Duncan, "Processing Ink In A Pen Windows Application; Power Programming Column; Tutorial," vol. II, No. 9, p. 397, May 12, 1992, PC Magazine.
"Document Signing At A Disctance . . . Product and Service News," Jul. 1993, vol. 10, No. 7, p. 3, Telecomuting Review: the Gordon Report.

(List continued on next page.)

Primary Examiner—Andrew W. Johns
Attorney, Agent, or Firm—Kenyon & Kenyon

[57] ABSTRACT

A computer-based method and system for capturing and verifying a handwritten signature. The handwritten signature may relate to a document, such as an electronically stored document. An image of the document is displayed. A user signs the document electronically, and the handwritten signature is electronically captured. A set of measurements relating to the handwritten signature is determined and stored in a signature envelope. Optionally, a checksum of a checksum of the document can be determined and stored in the signature envelope. The claimed identity of the signatory can also be stored in the signature envelope. The signature envelope is encrypted. The signature envelope can be communicated to another application or computer platform, or stored for later verification. The signature envelope is decrypted, and the set of measurements stored in the signature envelope are compared against a known set of handwritten signature measurements to verify the identity of the signatory. The system includes a database of signature templates storing verified signature information. The verified set of signature measurements are compared with the set of measurements stored in the signature envelope to obtain a similarity score. The present invention includes a gravity prompt feature to alert the signatory as to the nature, seriousness and/or contents of what is being signed. The gravity prompt can be stored in the signature envelope as part of the record of the signing event.

36 Claims, 10 Drawing Sheets

U.S. PATENT DOCUMENTS

| | | | |
|---|---|---|---|
| 4,495,644 | 1/1985 | Parks et al. | 382/3 |
| 4,495,664 | 1/1985 | Parks et al. | 382/3 |
| 4,625,076 | 11/1986 | Okamoto et al. | 178/22.11 |
| 4,656,474 | 4/1987 | Mollier et al. | 380/23 |
| 4,731,575 | 3/1988 | Sloan | 324/113 |
| 4,759,063 | 7/1988 | Chaum | 380/30 |
| 4,868,877 | 9/1989 | Fischer | 380/25 |
| 4,885,777 | 12/1989 | Takaragi et al. | 380/30 |
| 5,005,200 | 4/1991 | Fischer | 380/30 |
| 5,038,392 | 8/1991 | Morris et al. | 382/61 |
| 5,054,088 | 10/1991 | Gunderson et al. | 382/3 |
| 5,091,975 | 2/1992 | Berger et al. | 382/56 |
| 5,097,504 | 3/1992 | Camion et al. | 380/23 |
| 5,109,426 | 4/1992 | Parks | 382/3 |
| 5,111,512 | 5/1992 | Fan et al. | 382/3 |
| 5,131,025 | 7/1992 | Hamasaki | 379/95 |
| 5,195,133 | 3/1993 | Kapp et al. | 380/9 |
| 5,199,068 | 3/1993 | Cox | 380/23 |
| 5,202,930 | 4/1993 | Livshitz et al. | 382/3 |
| 5,226,091 | 7/1993 | Howell et al. | 382/3 |
| 5,251,265 | 10/1993 | Döhle et al. | 382/3 |
| 5,257,320 | 10/1993 | Etherington et al. | 382/3 |
| 5,278,905 | 1/1994 | McNair | 380/44 |
| 5,280,527 | 1/1994 | Gullman et al | 380/23 |
| 5,285,506 | 2/1994 | Crooks et al. | 382/13 |
| 5,297,202 | 3/1994 | Kapp et al. | 380/9 |
| 5,311,595 | 5/1994 | Bjerrum et al. | 380/25 |
| 5,321,749 | 6/1994 | Virga | 380/18 |
| 5,322,978 | 6/1994 | Protheroe et al. | 178/18 |
| 5,323,465 | 6/1994 | Avarne | 380/23 |
| 5,339,361 | 8/1994 | Schwalm et al. | 380/23 |
| 5,544,255 | 8/1996 | Smithies et al. | 382/119 |
| 5,647,017 | 7/1997 | Smithies et al. | 382/119 |

OTHER PUBLICATIONS

Mitch Betts, CW Staff, "Execs Can Sign Papers By Remote Control; Pen Computing–Based System Allows Addition of Handwritten Notes," Jun. 14, 1993, p. 57, *Computerworld*.

"Mobile World—Signing Documents Romotely By Pen Computer," Mar. 3, 1993, *Newsbytes News Network*.

"Peripheral Vision Ships PenOp: Software For The Handwritten Signature In Pen Computing," Sep. 21, 1993, *Business Wire*.

"Digital Ink Begins to Flow Onto Tablets . . . The Latest Word," May 11, 1992, vol. 6, No. 9, p. 21, *Seybold Report On Desktop Publishing*.

Yvonne Lee, "Third–Party Developers Lead As Pen Systems Part Ways," Apr. 20, 1992, *InfoWorld*, p. 1.

"Sign–On For Pen–Based Computing . . . Product Announcement," Nov. 1993, vol. 11, No. 11, p. 62, *Data Based Advisor*.

Mary F. Theofanos, John T. Phillips, "Digital Signatures: Signing and Notarizing Electronic Forms," Apr. 1994, vol. 28, No. 2, p. 18, *Records Management Quarterly*.

William Stallings, "Make It Real; Using Authentication In Network Security," Sep. 1993, vol. 8, No. 9, p. 105, *Lan Magazine*.

Henry Bortman, "On Beyond E–Mail, Apple's Open Colaboration Environment Operating Systems," Mar. 1992, vol. 8, No. 3, p. 191, *MacUser*.

DOCUMENT AND SIGNATURE VERIFICATION SYSTEM AND METHOD

This application is a continuation of application Ser. No. 08/644,084, filed on May 9, 1996, now U.S. Pat. No. 5,647,017, which is a continuation of application Ser. No. 08/298,991, filed Aug. 31, 1994, now U.S. Pat. No. 5,544,255, granted Aug. 6, 1996.

FIELD OF INVENTION

The present invention is directed to method and system for storing handwritten signatures in an electronic format, and in particular, to a method and system operatable on a plurality of platforms for verification of electronically stored handwritten signatures and related documents.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

Many computer systems, both static and portable, have been designed so that a user may enter data by means of a pen and a digitizer. Software exists to translate handwriting into recognized standard text. Many applications exist that are capable of taking advantage of pen input. Pen input facilitates the use of computers by those unfamiliar with or unskilled in the use of computer keyboards. Moreover, the use of pen-based computers, and the storage and transport of information in digital form, realizes an important commercial benefit—the reduction or elimination of the use of paper.

Digitizers typically sample the position of the pen tip around one hundred times a second, and are sensitive to movements of one seventieth of an inch. They are thus capable of very accurately recording the movement of the human hand. Computer signature verification can exploit this by analyzing not only the visible shape of the signature but also dynamic aspects such as speed and rhythm.

Algorithms exist that can take pen-based input (such as a handwritten signature), determine the fundamental characteristics of the pen-based input, and represent the characteristics of the pen-based input in an electronic format. Algorithms also exist that can determine if handwritten signatures in electronic format are that of the same person. For example, see U.S. Pat. No. 5,109,426 (U.K. Application No. 90 24383.3), U.S. Pat. No. 4,495,644 and U.K. Application No. 1480066, all expressly incorporated by reference herein.

Signature verification can make a highly significant contribution to computer security, in that all other security mechanisms rely upon what a person knows (e.g., a password) or possesses (e.g., a physical key). By relying instead on an aspect of physical behavior which cannot be stolen or divulged, signature verification offers secure evidence as to the real identity of the user.

To date, signature verification has been employed mainly in the area of access security, with the object of verifying the identity of an individual before giving the user access to all or part of a computer system.

However, traditional signatures made on a piece of paper are used to witness intentions in such contexts as signing a contract or will, and as a shield against repudiation as when signing a money order.

There are many areas today where, despite the availability of computerized documents, it is necessary to rely upon paper because of the legal or cultural requirement for a signature.

Thus, it is often the case that a hardcopy of a document is preferred to that same document in a digital or electronic format. For example, a will or contract for the transfer of land is required by law in most jurisdictions to be in writing and to include original handwritten signatures of the parties and witnesses to the document. When a document is in electronic form, because it is relatively easy to manipulate the contents of the document, it is often uncertain if a document viewed at a later date is the same as the document originally created. Although handwritten signatures captured using pen input facilities can be incorporated in the text of such documents, one is never certain if a document viewed at a later date is the one that was "electronically" signed.

Accordingly, it would be desirable to apply the science of handwritten signature capture and verification to a much wider context than as a security access mechanism. In particular, there exists a need in the area of testifying to an intention (such as, for example, signing a legal document) for a secure signature capture and verification method that relates the document signed to the signature of the signer.

Existing systems have focused on whether an electronic version of a signature has been manipulated after it was created and whether an electronic version of a signature associated with an electronic document was captured at the time of a transaction to which it relates. For example, U.S. Pat. No. 5,195,133 to Kapp et al. describes a mechanism that attempts to assure that a signature purportedly approving a commercial obligation was captured at the time of a questioned transaction and is not a genuine signature obtained on some other occasion and fraudulently merged into the digital record of the transaction. The apparatus of the Kapp et al. patent creates a digital record of a transaction, captures a digital representation of a signature at the time of the transaction, and then uses the digital record of the transaction to encrypt the digital representation of the signature. This method aims to ensure that the representation of the signature was made when it is said it was made. However, such a system does not verify if the document that was signed using a digitally captured handwritten signature has been later modified. Moreover, systems such as the Kapp et al. system require a transaction, and are incapable of operation where a signature is to be captured and verified in an environment unrelated to a transaction.

Existing handwritten capture and verification systems are designed for use on a single platform. Often, the handwritten signature is encoded in such a way that other applications are not capable of utilizing the electronic form of the handwritten signature. By virtue of today's advanced computer-to-computer communications, including communication over the Internet, many applications will not require that verification be performed upon the same machine or at the same time as the act of signing itself. For example, it would be desirable for a system to enable a handwritten signature to be captured electronically on one device, stored, electronically transmitted to another device on another computer platform, and later verified. Accordingly, there is a need for an integrated cross-platform signature verification system. In particular, there is a need for a system that does not presuppose any particular underlying hardware, and is designed to be portable across different types of computer and operating system.

Many businesses and government departments often require people to sign documents. For example, when buying goods by check or credit card, when signing a car rental agreement, when entering a lease, when applying for a driver's license or other government permit, on election day, or to certify attendance at an examination. Often, the person requesting the signature does not know the individual who is required to sign, and does not have an authentic signature of the signer to compare with the requested signature. Moreover, even if an authentic signature is available for comparison, the person requesting the signature often is unskilled in determining whether two signatures are from the same person. Accordingly, there is a need for a system that allows a signature to be captured electronically in one location, electronically transmitted to a central location that has recorded verified signing behaviors of many individuals, and returns an indication of the identity of the signer.

In certain situations, a person who has signed a contract or other legal document will attempt to terminate his or her obligations by claiming at a later date that he or she did not understand the nature of the document being signed or that he or she was misled when signing the document. Moreover, in a multi-windowed computing environment, a person signing a document electronically may not be sure which document stored on the computer he or she is actually signing. It would be useful if a record was made at the time of signing (that could later be retrieved) that records what the signer was told when signing a document and, before signature, alerts the signer as to the identity, nature and gravity of the document being signed.

In short, there is a need for a system that takes advantage of the increasing availability of these pen-based input devices by enabling the application of handwritten signature capture and verification technology to be used in the diverse contexts where signature capture is needed.

SUMMARY OF THE INVENTION

The present invention provides an integrated method and system for the electronic capture of a handwritten signature, storage of the handwritten signature in electronic form, electronic transportation of the captured handwritten signature, and authentication of the captured handwritten signature.

When used herein, the term "signature" means the handwritten mark made by a person that represents that person's intent or assent. It includes what is usually regarded as a person's autograph. The term "signed" has a corresponding meaning, and includes any symbol executed or adopted by a party with present intention to authenticate a writing, where such writing may be in an electronic format. It is noted that the term "signature" as used herein does not include what has come to be known in computer science fields as a "digital signature", i.e., an electronic code that is used to establish the identity of the person creating or sending an electronic document. A "digital signature" has the function of replacing a handwritten signature, with a secret alpha-numeric "key" supplied to a given individual, which then has to be kept secret. In contrast, the present invention is directed to electronically capturing and manipulating a person's handwritten signature.

In the representative embodiment, the present invention utilizes known pen-based hardware to electronically capture handwritten signatures.

The representative embodiment of the present invention comprises a signature capture module, a signature verification module and a template database.

The signature capture module captures the signature of a person and creates a signature envelope representing (or recording) the act of signing. The signature envelope stores certain data associated with the manual inscription of a signature captured in electronic form, for example, on a computer screen of a pen-based computer. Typically, the signature capture module is called and controlled by, and communicates with, a client application.

For example, the client application may require a handwritten signature for a document. The client application calls the signature capture module, which will display on the screen a signature capture window and request that the user inscribe his or her signature (for example, using an electronic stylus) to this window on the computer's screen. The client application may supply to the signature capture module an identification of the document being signed and/or the reason why (or importance of) the document being signed. This information, called a gravity prompt, can be displayed to the user by the signature capture module in the signature capture window. This allows the user to make sure that the document being signed is the one that the user believes he or she is signing, and moreover, alerts the user to reason for and the gravity of the act of signing.

As the user signs the document, (e.g., by moving the pen or stylus across the screen), an image appears that traces the movement of the stylus. Thus, the user's signature (or autograph) is displayed to the user. At the time of signing, the signature capture module measures certain features of the act of signing, such as, for example, the size, shape and relative positioning of the curves, loops, lines, dots, crosses and other features of the signature being inscribed, as well as the relative speed at which feature is being imparted. These measurements can be termed "act-of-signing measurements."

In the representative embodiment of the present invention, the signature capture module may create a checksum of the document that was signed. The document checksum can be used at a later date to verify that the document alleged to have been signed is the one that was signed, and further, that no change to that document has been made.

In the representative embodiment, the document checksum is not a complete statement of the original document, and the original document cannot be derived from the document checksum. The document checksum bears a mathematical relationship to the document. If the document is changed, then it can no longer be mathematically matched with the checksum.

In an alternative embodiment, a compressed representation of the document that was signed can be created in addition to, or as an alternative to, the document checksum.

The signature capture module encrypts data representing, inter alia, the act-of-signing statistics, the time and date of signing, the claimed identity of the signer, the words that appear in the gravity prompt, the document checksum, and optionally, data representing a graphic image of the signature. The signature capture module creates a signature envelope that comprises this encrypted data. In the representative embodiment, the signature envelope is an encrypted string of data. Accordingly, the signature envelope is a secure way to represent the inscription event.

According to the representative embodiment, the client application cannot decrypt or alter the information contained in the signature envelope.

The signature verification module reports the probability that a particular signature is authentic. The signature verification module has access to the template database. The template database stores a plurality of templates. Each template includes act-of-signing statistics for a person and the known identity of that person. Each template is created during a controlled enrollment process, and stored in the template database for later access.

In the representative embodiment, the signature verification module and template database may be located at a remote location, accessible by many client applications. For example, the signature verification module and template database may be located at a central independent signature verification bureau. In an alternative embodiment, the signature verification module and template database are located upon the local system, accessible by the client application when necessary.

When a client application wishes to verify a signature, the client application passes the signature envelope representing the signature to be verified to the signature verification module. It is noted that each client application can have verified signatures that were created by that client application, or that were created at an earlier time by other client applications.

For example, the signature capture module may reside on many computers, such as, for example, a fleet of portable pen-based computers, while the signature verification module may reside on a single host computer. The portable computers might capture numerous signatures over time (and thereby create numerous signature envelopes) and transmit them to the host computer for verification.

When the signature verification module is presented with a particular signature envelope, it can be directed to evaluate whether the signature envelope is a product of an authentic inscription of the signature belonging to the user identified in the signature envelope. The signature verification module can decrypt the signature envelope and compare the information therein with the signature templates stored in the template database. Based on this comparison, the signature verification module can determine a signature match percentage (e.g., 78%) and report this, and other information stored in the signature envelope, to the client application.

Accordingly, the present invention enables electronically captured handwritten signatures to be used in the same contexts as traditional paper signatures. Signatures captured according to the present invention will exceed the "performance" of traditional signatures by using computer technology to assist in the detection and prevention of forgery and fraud.

The present invention is designed for use in conjunction with existing software programs, for example, as a software component to be activated by other computer programs. The present invention can be used as part of a security program to allow a user access to a computer network, as part of a word processing program, or as part of an e-mail program (e.g., to verify the identity of a sender of an e-mail message). The present invention takes care of the processing which specifically relates to signature capture and verification. (As used herein, the programs making use of the services of the modules of the present invention are termed "client programs".)

Thus, client programs may use the present invention to capture signatures for all kinds of purposes. The present invention enables the traditional manner of indicating agreement (a handwritten signature) to be carried forward into new technological environments, while avoiding the need for paper. For example, the signature capture module of the present invention might be made to reside in a cable television converter unit (sometimes called a "set-top box") that is fitted with a digitizer, so that a viewer can authorize the supply of various goods and services using the present invention. Signatures so captured would be transmitted back down the line to the provider's system where they can be submitted to a signature verification module prior to delivery, and then archived as a record of the event. An advantage of this method is that the members of a household can be individuated (for example, parent, child, etc.) without requiring them to carry and secure personal cards, or furnishing them with "secret" numbers and the like. The present invention can easily be enhanced by implementing the signature capture module within a handheld remote control unit fitted with a suitable touch-sensitive digitizer, for example, on its reverse side.

Another example is in applying for a loan to purchase a vehicle while at a car dealership. A handwritten signature could be captured by the signature capture module. The resulting signature envelope could then be submitted to an independent signature verification bureau. The verification score returned could then be figured into the overall credit assessment before the applicant is allowed possession of a vehicle.

Signatures may also be captured where subsequent verification is either not required or even possible where a signature provided by an individual to a signature recipient is the first sample. Examples include a marriage license affidavit signed by both bride and groom, a hotel register signed by a guest, and a parcel delivery note signed by the recipient.

Thus, for example, a signature can be transmitted to a remote site for verification before allowing access to the remote computer system; or a signature may simply be stored in a computer archive as a record that a particular person approved a particular document or transaction; or it may be desirable to verify a signature immediately in order to decide whether to allow the user access to a particular electronic document. To this end, the present invention provides extensive functionality to the client program.

The present invention does not allow signature data (especially, the signature envelope) to become subject to fraudulent misuse. Client programs can not access signature data except in encrypted form, nor can they obtain information which would be of material assistance to a prospective forger.

A unique security feature of the present invention is that rather than transmitting the raw signature data to the verifier (i.e., rather than allowing the signature capture module to transmit raw signature data to the signature verification module), feature extraction is carried-out at completion of capture. The raw signature data is, in the representative embodiment, not stored in the signature envelope nor made available at any stage to the client program. This makes it impossible to recreate raw signature data through the examination of the signature envelope and subsequently to re-inject the raw signature data into the system. This also reduces the amount of information to be transmitted or archived prior to verification.

The present invention can be used to assist in the detection of unauthorized modification of electronic documents. As stated above, a document checksum is calculated from the character codes making up the document, and stored away from that document as part of the signature envelope. The document checksum obtained from a modified document would be different, and thus the modification can be detected. The present invention uses an advanced check-summing method to bind signature envelopes to documents in support of a complete electronic metaphor for ink drying on paper. Together with the gravity prompt, this assists in maintaining a single intended use for each act of signing, such that a signature submitted on one document cannot be used on another.

DETAILED DESCRIPTION

Figure 1:
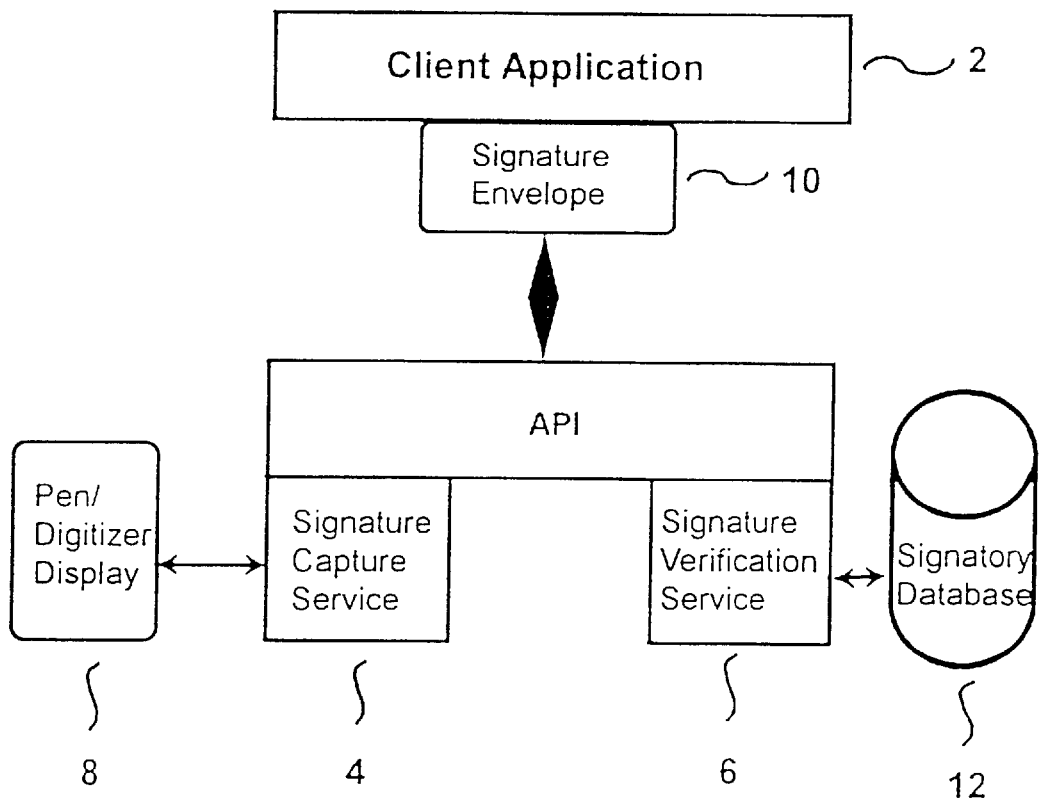
FIG. 1 is a block diagram illustrating a typical system architecture according to the present invention.

Turning now to the drawings, and initially FIG. 1, there is illustrated in block diagram form a typical system utilizing the components of the present invention.

FIG. 1 shows an architecture where the signature capture and verification functions are performed on the same device. A client application 2 requests that a signature be captured. The client application presents the required information to a signature capture module 4 (also called a signature capture service), which in turn requests that a user sign his or her signature using the appropriate hardware devices, such as, for example, a combination of a pen/digitizer and display 8. The signature capture module 4 creates a signature envelope 10, as explained in detail below, and passes (or makes available) the signature envelope to the client application 2.

When the client application 2 wishes to verify a signature, it passes the signature envelope 10 to a signature verification module 6 (also called a signature verification service). The signature verification module 6 accesses a template database 12 (also called a signatory database) that contains templates of signature information and information as to the "owner" of the signature, and returns a signature match percentage to the client application 2.

Figure 2:
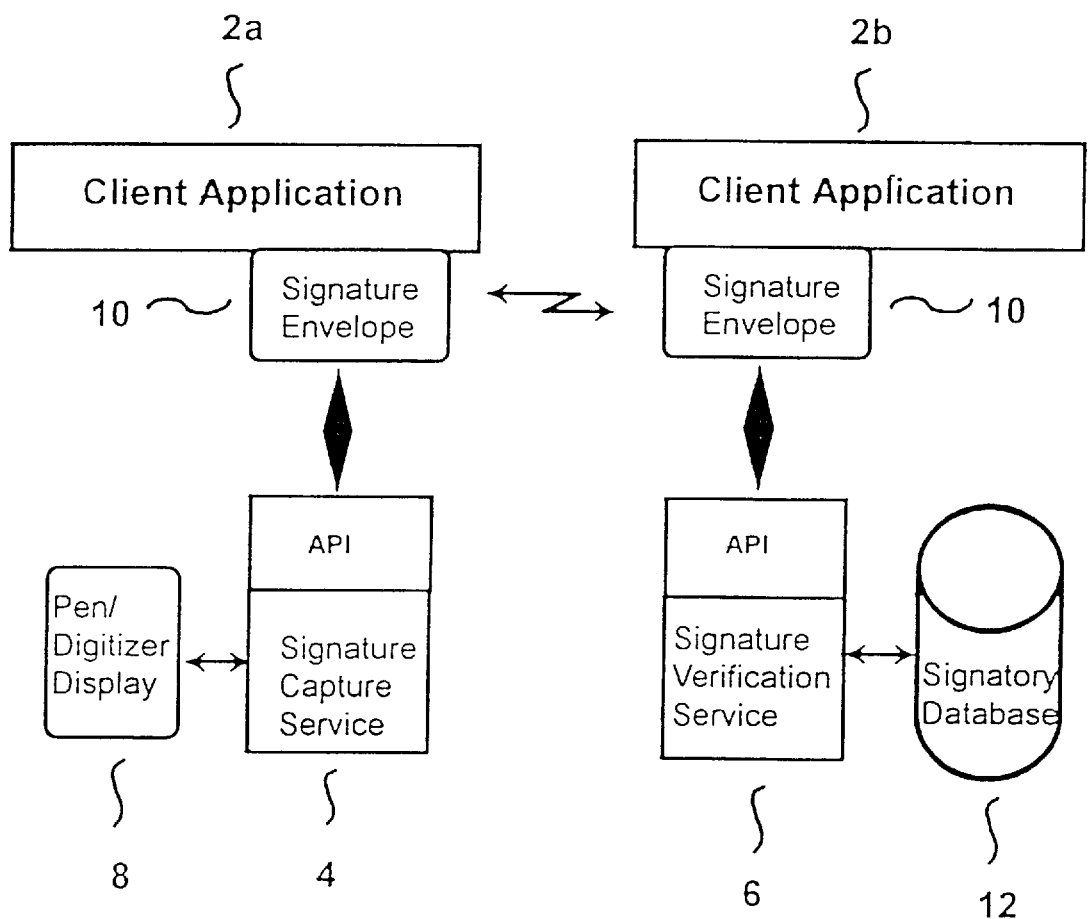
FIG. 2 is a block diagram illustrating a typical system architecture according to the present invention for use where a signature is captured on one platform and verified on a second platform.

FIG. 2 shows an architecture where the signature is captured on a pen-equipped computer, but verified on a remote system. In FIG. 2, there are two client applications 2i aand 2b. In this embodiment, client application 2a resides on a pen-equipped computer. Client application 2a requests that a signature be captured. The signature capture module 4 captures a signature and returns to the client application 2a a signature envelope 10. This signature envelope 10 can be transferred to other client applications, e.g. client application 2b. Client application 2b may wish to have a signature represented by a signature envelope 10 verified. If so, the client application 2b passes the signature envelope 10 to the signature verification module 6, which verifies the signature.

It is noted that the open architecture of the present invention allows for many varying configurations. For example, the signature verification module 6 and the template database 12 may reside on a single commuter system. Alternatively, there may be may signature verification modules 6 residing on different platforms, all able to access a remotely located template database 12.

The signature capture module 4 and the signature verification module 6 utilize a set of APIs (Application Program Interfaces) to permit the incorporation of signature capture and verification into many different applications, e.g., 2a and 2b. Applications can determine the context for each signature and the criteria for signature verification thresholds.

In the representative embodiment, the present invention is implemented on International Business Machines Corp.'s Pen for OS/2 (with C++ interface) and on Microsoft Corp.'s Windows for Pen Computing (with C++ and Visual Basic interfaces). The signature capture module 4 and the signature verification module 6 are designed to be incorporated into or activated by other computer programs. They should thus be considered as a self-contained software components.

In the representative embodiment, the signature capture module 4 requires the availability both of a graphical display device and a digitizer. Under both Windows for Pen Computing and Pen for OS/2, any graphical display device supported by the operating system may be used, for example, Wacom, Calcomp, Kurta, etc. In addition, the computer processor can be any pen-based computer supporting either of these operating systems, such as, for example, Compaq's Concerto computer or IBM's P-Series Thinkpad computer.

The signature verification module 6 requires no specific hardware, and can be implemented under any computer operating system which, in the representative embodiment, supports a C++ compiler or cross-compiler.

The present invention can be considered as having three seperatable subsystems, namely:

a. the signature capture module 4, for recording acts of signing and creating signature envelopes 10;

b. the signature verification module 6, for measuring an a signature envelope against an individual's signature profiles, i.e., against "templates"; and c. the template database 12.

To illustrate the use of these three subsystems, consider a simple application of signature verification to regulate access to a computer system. The client program 2 in this instance will wish to capture a signature and then verify it in order to receive evidence as to the identity of the computer user. In this case, the steps to be followed will be:

Establish the claimed identity of the user

Capture his signature, together with the time and date of signing, and a prompt appropriate to the application Using his claimed identity, locate his signature template Establish whether the signature sufficiently matches the template of the user These steps can be described in context of the three subsystems as follows:

Having established the claimed identity of the user, construct an empty signature envelope 10 bearing that user's identifier.

Cause the signature capture module 4 to collect signature data into the signature envelope 10, together with time and date and a textual representation of the reason for signing.

Cause the signature verification module 6 to locate the template relating to the signatory whose identity was stored in the signature envelope 10, by searching in the template database 12

Cause the signature verification module 6 to verify the signature envelope 10 against the found template.

The signature verification module 6 works in the representative embodiment as follows. The difference between each signature measure (obtained from the signature envelope 10) and the average (obtained from the template) is calculated and divided by the standard deviation for that measure as calculated during enrollment. The highest resulting value is stored and all values are totalled and averaged. The highest value and the average are then scaled by two factors to give comparable values, and the largest of these is retained. If it is smaller than a given (small) value M, the maximum score of 100 is returned. Likewise, if it is larger than a given (larger) value, the minimum score is returned. Otherwise, this result is subtracted from M+1 and the difference multiplied by 100 to give a value in the range 0 to 100 inclusive. This value is then returned to the client application 2.

Returning a score to the client application 2 allows the client application 2 to determine whether, in the context to a particular transaction, whether the signature passes or fails. For example, if the document being signed was a loan document for $1,000, a score of 75 or higher may be required by the client application 2 as a passing score. However, if the document being signed was a withdrawal slip to withdraw $200,000 from a bank account, then the client application 2 could require a score or 95 or higher as the passing score.

Using this architecture, the present invention enables capture and verification of handwritten signatures to take place on different platforms. The present invention creates a transportable data type recording an act of signing and that is capable of being linked (or "bound") to a document.

The present invention can be best understood by reference to the nature of these three subsystems, the operations which it allows to be performed upon them, and the mechanisms it provides for their interaction.

1. The Signature Envelope 10

The signature envelope 10 can be considered as a complex bundle of encrypted data which represents a digital recording of a physical act of signing.

However, the act of signing is not considered purely as a physical act: in reality it cannot be divorced from context such as the intentions of the signatory, the date and time, the document signed and so forth. The signature envelope 10 also contains data relating to these essential concomitants.

Before the signature is captured, the signature capture module 4 is provided with the following information, usually from the client application 2:

a summary (in the form of a short piece of text) of the user's intention in signing. This is displayed by the signature capture module 4 in a distinctive manner, in close proximity to the area of the computer display where the user's signature will be represented. This short piece of text is known as the "gravity prompt", since it indicates the gravity of the act of signing. For example, the gravity prompt might read "I consent to pay $49.50 to George Beale" or "I agree to sell my house to Fred Denning for $23,000" or "You are signing the document entitled 'Letter', file name let.wp" or "Sign to approve Credit Agreement";

optionally, a reference to a computer file representing a document which is to be signed by the user;

whether a visual representation of the signature should be stored inside the signature envelope 10;

optionally, a key used in the generation of an integrity checksum.

Figure 3:
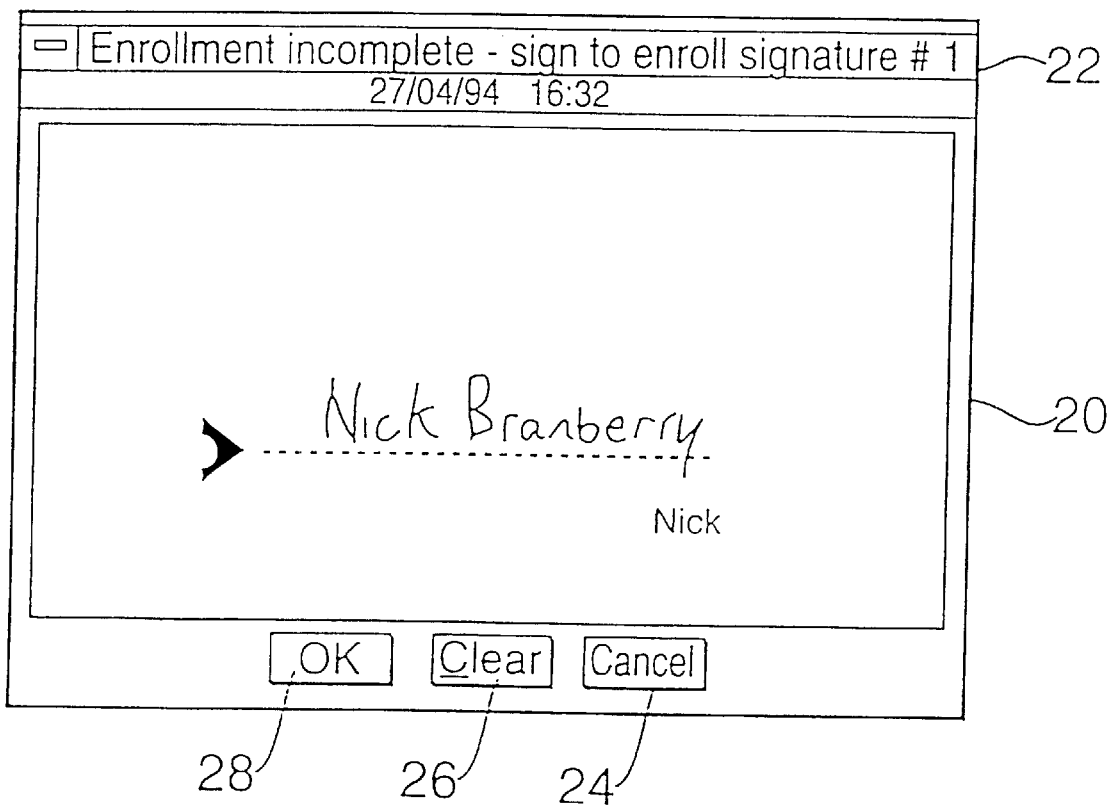
FIG. 3 shows a window used for capturing handwritten signatures, and an example of a gravity prompt.

When the signature capture process is started, a form or window 20 (similar to that shown in FIG. 3) is shown on the computer screen and the gravity prompt 22 is displayed by the signature capture module 4. (In FIG. 3, the gravity prompt reads "Enrollment incomplete—sign to enroll". This gravity prompt is used in the enrollment process when creating a template, described in further detail below, and informs the user that he is signing to create a template.) The user may at any time elect to cancel the transaction by activating a "Cancel" control 24 displayed on the form, by tapping it with his pen.

The user may also re-start the signature capture (e.g. if his arm is jogged) by activating a "Clear" control 26 in a similar manner. If the user activates an "OK" control 28, then the signature capture is completed, but subject to the following constraints:

the signature must take a certain time to complete;

the length of the line drawn must be greater than a certain minimum;

the signature data must exhibit a certain complexity;

the pen must not be static for more than 2 seconds.

If any of these constraints is violated, then a message is displayed to the signatory, the signature is rejected (as if the user had operated the "Clear" control 26) and the system prepares itself to accept another signature.

At this point the signature capture module 4 stores into the signature envelope 10 the following information:

the date and time of the act of signing the gravity prompt the claimed identity of the signatory the identity of the machine on which the signature was captured an identifier representing the computer program which initiated the signature capture, i.e., the client application 2 measures and statistics relating to the signature, e.g. the shape, the number of pen strokes, the overall time taken to sign, etc.

optionally, a checksum calculated from the computer file or document whose reference was originally specified as the file or document to which the signature that was captured relates optionally, a compressed representation of the image of the signature in vector form an integrity checksum.

The present invention will not permit any alteration of a signature envelope 10 after the signature has been captured. The data maintained in a signature envelope 10 is check-summed before encryption so that any unauthorized modification can be detected.

Figure 3A:
FIG. 3A shows a further example of a gravity prompt.

As illustrated in FIG. 3A, the client application 2 may supply to the signature capture module 4 an identification of the document being signed and/or the reason why (or importance of) the document being signed. This information is the gravity prompt 22. In the representative embodiment, the gravity prompt 22 is displayed to the user in the signature capture window 20. This allows the user to make sure that the document being signed is the one that the user believes he or she is signing, and moreover, alerts the user to reason for and the gravity of the act of signing. In the representative embodiment, the gravity prompt 22 is stored in the signature envelope 10. Thus, the gravity prompt 22 can be retrieved and displayed at a later stage by other applications (which could be operating on other platforms). As shown in FIG. 3A, the document being signed is a consumer credit application of five pages, part of which is displayed in a window 30. The title of the document being signed is displayed in a title bar 32 for the document by the client application 2. The gravity prompt 22 reads "Sign to approve Credit Agreement." Here, the client application 2 supplied the text "Sign to approve Credit Agreement" to the signature capture module 4—this text is stored in the signature envelope 10. The signature capture window 20 in FIG. 3A is displayed over the window 30 that contains the document being signed.

The present invention (in the representative embodiment the signature verification module 6 would perform these functions) provides the following functionality, when requested by a client application 2, in connection with the signature envelope 10:

Disclosure of the claimed identity of the signatory

Disclosure of the date and time of the act of signing

If the option to checksum a document was exercised at the time the signature was captured, an indication of whether a given computer file representing a document is identical with that originally checksummed If the option to store a visual representation of the signature was exercised at the time the signature was captured, the facility to display the signature on the computer's screen If the option to store a visual representation of the signature was exercised at the time the signature was captured, the facility to generate a standard-format disk file containing the visual representation in bitmap form Verification against a template.

Additionally, the present invention can perform the following functions relating to a signature envelope 10:

Encoding from memory into a data block for archiving or for transmission to a remote system Construction of a signature envelope 10 in memory from a data block retrieved from an archive or via electronic data transmission.

The data block retrieved from memory is an encrypted block of memory containing sufficient data to reconstruct an object identical to that which was originally written-out. Effectively, the data block is an encrypted, portable block of information preserving the entire state of the source object and enabling it to be recreated on the same or a remote system.

These data blocks are used to preserve an object in an archive, or to transmit a copy of an object to a remote system. Essentially the data blocks contain the same information as the original object, but expressed in a highly-structured form such that the data object can be reconstituted at a later date from the same block of data.

In the representative embodiment, the signature envelope 10 is encapsulated as a software object. A representation of a typical signature envelope software object is as follows:

DATA signature envelope version number machine serial number machine boot time machine type (a number)

claimed ID (a sequence of characters identifying the signatory, recognized by the by the capturing application)

header text (variable length ASCII text)

compressed representation of signature's appearance file checksum keyed internal checksum for integrity

| METHODS | |
|---|---|
| capture | displays UI components and collects the signature |
| render | draws an image of a captured signature on a display |
| write_tiff_file | writes image to a file in TIFF format |
| write_win_bmp_file | writes image to a file in Windows bitmap format |
| write_os2_bmp_file | writes image to a file in OS/2 bitmap format |
| is_captured | returns whether the signature envelope 10 contains a signature |
| has_image | returns whether the signature envelope 10 contains an image |
| mc_sno | returns the serial number of capture machine |
| mc_type | returns type of capture machine |
| time_signed | returns date/time of capture |
| claimed_id | returns claimed ID string |
| gravity_prompt | returns gravity prompt |
| verify_file | checks contents of file against checksum stored |
| import | fills in the data from an encrypted data block |
| export | fills in data block with encrypted internal data |

Figure 4:
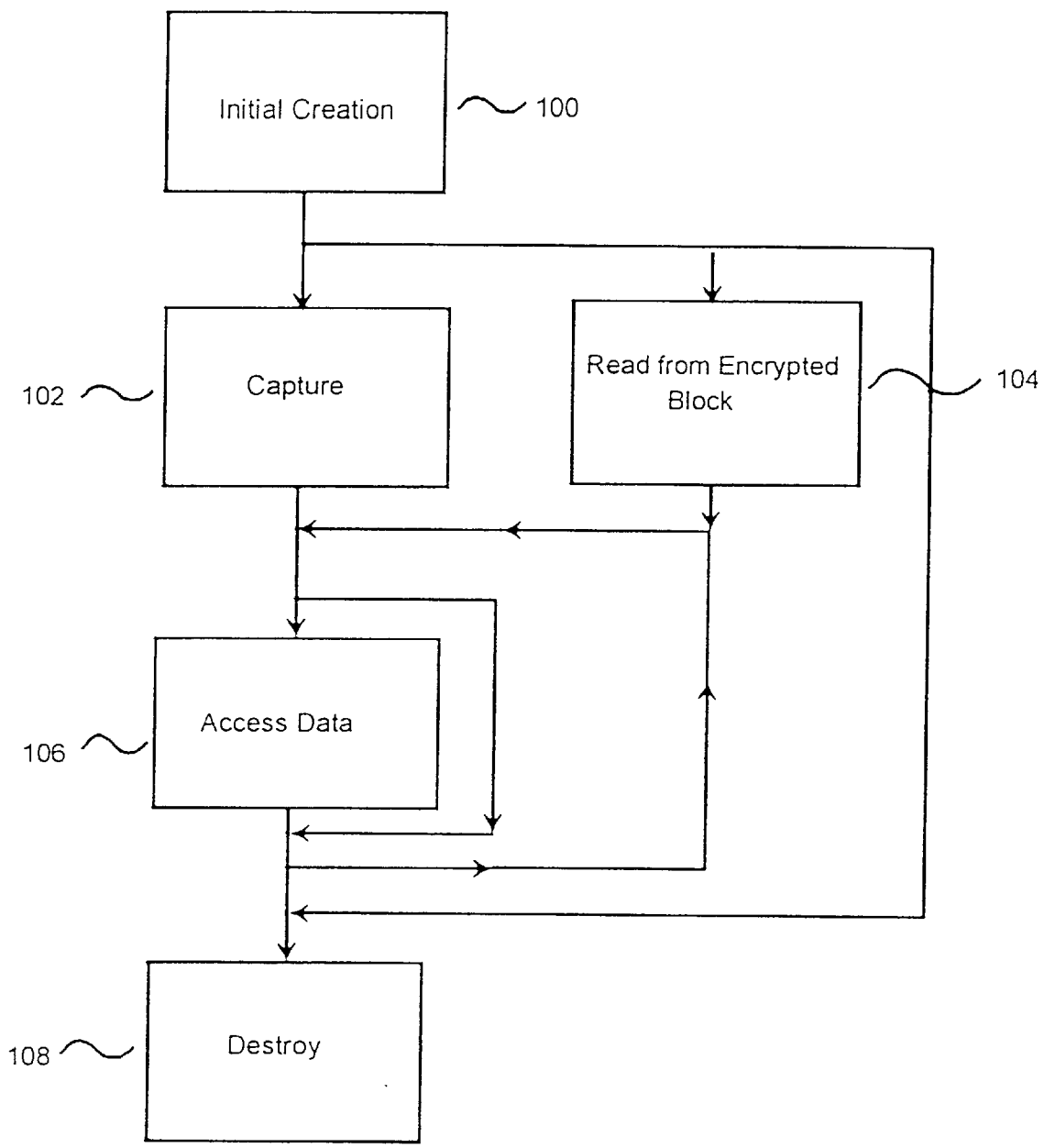
FIG. 4 is a flow diagram of a signature envelope life cycle.

A typical life-cycle for the signature envelope object of the present invention is summarized in FIG. 4. in flow chart form, and discussed in detail below.

Creation (step 100)

When the software object is created it is initialized to a state in which signature capture can be initiated.

Capture/Import

Capture (step 102)

Figure 5:
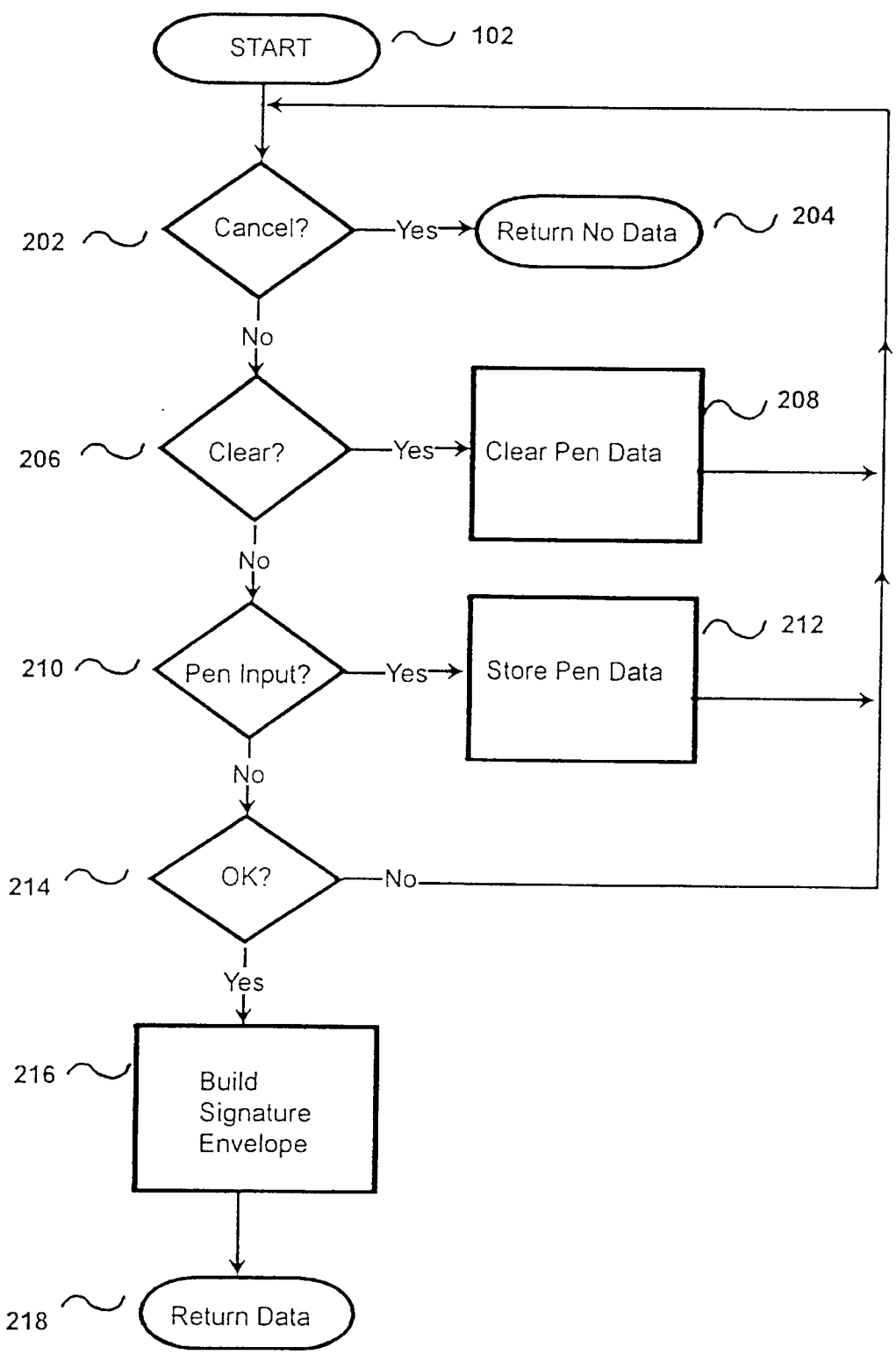
FIG. 5 is a flow chart illustrating typical steps in a signature capture process.

The sequence of events is in the capture process is represented in further detail in FIG. 5. The capture step (102) is, in the representative embodiment, performed by the signature capture module 4.

If the signature envelope 10 object was captured previously, the capture request is denied.

The client program specifies the gravity prompt to be displayed, whether the signature image is to be retained, and whether a document is to be check-summed for document binding.

If a document is to be checksummed, the file that document is stored in is perused and a checksum built. The representative embodiment of the present invention uses a Message Digest technique to checksum the document, such as published by RSA Inc.

Then the user interface components are displayed upon the computer's graphics screen in a distinctive manner, so as to alert the user to the fact that a secure and binding signature is to be captured (see e.g., FIG. 1).

If the user operates the "Cancel" control 24, then appropriate status is returned to the client program (steps 202 and 204).

If the user operates the "Clear" control 26 (step 206), then any pen data previously collected are discarded and the image of the abandoned signature is cleared from the display (step 208).

If the user operates the pen in the signature capture area (step 210), data representing the movements of the pen are collected and stored in memory (step 212).

If the user operates the "OK" control 28 (step 214), then the signature capture module 4 analyzes the captured pen data and records certain measurements.

In the representative embodiment, the measurements performed by the signature capture module 4 are as follows:

| | |
|---|---|
| M0 | Number of strokes |
| M1 | Total time |
| M2 | Pen-down time |
| M23 | Total line-length |
| M23/M0 | Average stroke-length |
| M2/M0 | Pen-down time/Number of strokes |
| M1/M23 | Average speed |
| | Sum of times of slowest points in each stroke |
| | Sum of times of fastest points in each stroke |
| M34 | Sum of positions of slowest points in each stroke |
| M35 | Sum of positions of fastest points in each stroke |
| M36 | Sum of pen-down positions |
| M37 | Sum of pen-up positions |
| M38 | Number of acceleration and deceleration maxima ("events") |
| M40 | Sum of position at events |
| M41 | Sum of time at events |
| | Average pen-down time |
| | Average pen-up time |
| M35/M1 | fastest point time skew |
| M37/M23 | Scaled sum of pen-up positions |
| M23/M38 | average acceleration/deceleration distance |
| M39/M23 | Sum of duration of events/total line-length |
| M40/M1 | event time skew |
| M41/M38 | average time of events |
| | −ve/+vd Y distance |
| | +ve/−ve X distance |
| | Y distance/X distance |
| | max X/max Y |
| | Y distance/(max Y + 1) |
| | No. of Y turns, amplitude > 0.8 mm |
| | Net area |
| | Sum of differences of speed deltas |

Optionally, the pen data without time information is compressed, vectorized and stored for purposes of rendering an image of the signature, either to the computer display screen or to a bitmap file. The date and time of signing, machine details and gravity prompt are likewise stored. Then a checksum of the data block is generated to prevent subsequent alteration (step 216).

The present invention includes a built-in integrity check which can be explained as follows. Before encryption, the contents of the signature envelope 10, together with a key provided by the client application 2, are checksummed using the same technique as is used for checksumming the file. Without knowledge of the key used by the original client application 2 when it caused the signature envelope 10 to be built, it would therefore be impractical to modify the signature envelope 10 and regenerate a satisfactory checksum. By providing the correct key when performing an integrity check, the client application 2 can ensure that (provided the key was not disclosed) the signature envelope 2 was not decrypted, modified and re-encrypted.

Import (step 104)

Previously-captured signature data is decrypted from a memory block and stored appropriately into the data structure.

Data Access (step 106)

In the representative embodiment, data access functions are performed by the signature verification module 6.

Export

The data in the signature envelope 10 is stored in a memory block and encrypted.

Render signature image upon the computer display

If no signature image was requested by the client program 2 which originally captured the envelope, then an error status is returned to the client requesting render.

Otherwise, the signature image is displayed, scaled appropriately.

Bitmap File Generation

Bitmap files are created using a standard image file format. The following formats are candidates used by the representative embodiment of the present invention:

TIFF

OS/2 Bitmap

Windows Bitmap

In response to a request from the client program, the system of the present invention will place decrypted information about the following into memory for access by the client program:

Claimed ID

Date and/or time of Signature

Size of exported data block

Whether or not the signature envelope 10 contains a captured signature

Whether or not the signature envelope 10 contains a signature image

Serial number of machine on which signature was captured

A number representing the type of machine on which the signature was captured

The gravity prompt

Whether the built-in integrity check succeeds or fails

Whether or not a given file is identical with that originally checksummed when the signature was captured.

Destruction (step 108)

Dependent data allocations are destroyed.

2. The Template

Templates are not handled directly by client programs 2, but instead are accessed through the medium of a software component embodying a database of templates.

When initially created, a template is blank. The present invention permits a client program 2 to detect this and to use a succession of signature envelopes 10 to "fill in" the template. This process, known as "enrollment", can be likened to a learning process during which the typical behavior of a signatory and the respects in which his signing behavior is most consistent can be determined.

During the enrollment phase, the degree of similarity between the signature envelopes 10 received will influence the quality of the final template. If the signature envelopes are different enough, then verification becomes impossible and the enrollment process is re-started. Otherwise, the degree of coherence of the signature envelopes received during enrollment can be ascertained when taking into account the verification scores: the greater the coherence, the greater the reliability of the verification process.

Because the integrity of a template will be crucial to security-conscious application programs, the template contains information about an "owning" application. Only the owner of a template can perform certain sensitive operations upon it.

A template stores the following information:
Average values for signature measures and statistics
Indicators of the variability of these statistics
Indicators of the state and quality of the enrollment
Date and time of most recent signature envelope 10 verified
Performance indicators
ID of the "owning" program
Date and time of creation
unique identifier The present invention offers the following functionality in connection with the template:
Disclose the date of creation
Disclose the state and quality of the enrollment
Enroll a signature envelope 10 (owning program only)
Force re-enrollment (owning program only)
verify a signature envelope 10

The verification procedure aims to give the client program 2 an indication of the probability of forgery in the form of a score. This score, perhaps coupled with information about the quality of the enrollment, enable the client program to make a decision as to the admissibility of the signature based on its own criteria.

Because over the course of time an individual's signature will undergo gradual change, the present invention will in certain circumstances "bend" the signature envelope 10 in favor of consistent variations in the behavior of the signatory. This "bending" takes place subject to certain internal checks, and may optionally be suppressed by the client application. If the signature envelope 10 being verified is older than the most recent signature envelope 10 successfully verified, then again no "bending" takes place. (See step 318 of FIG. 6, discussed in detail below.)

In the representative embodiment of the present invention, each template is implemented as a software object. A typical life-cycle for a template software object is summarized in flow chart form in FIG. 6 and is described in detail below.

Creation (step 302)
When a template software object is created, it is initialized to a state in which either enrollment, import or export can be initiated.

Figure 7:
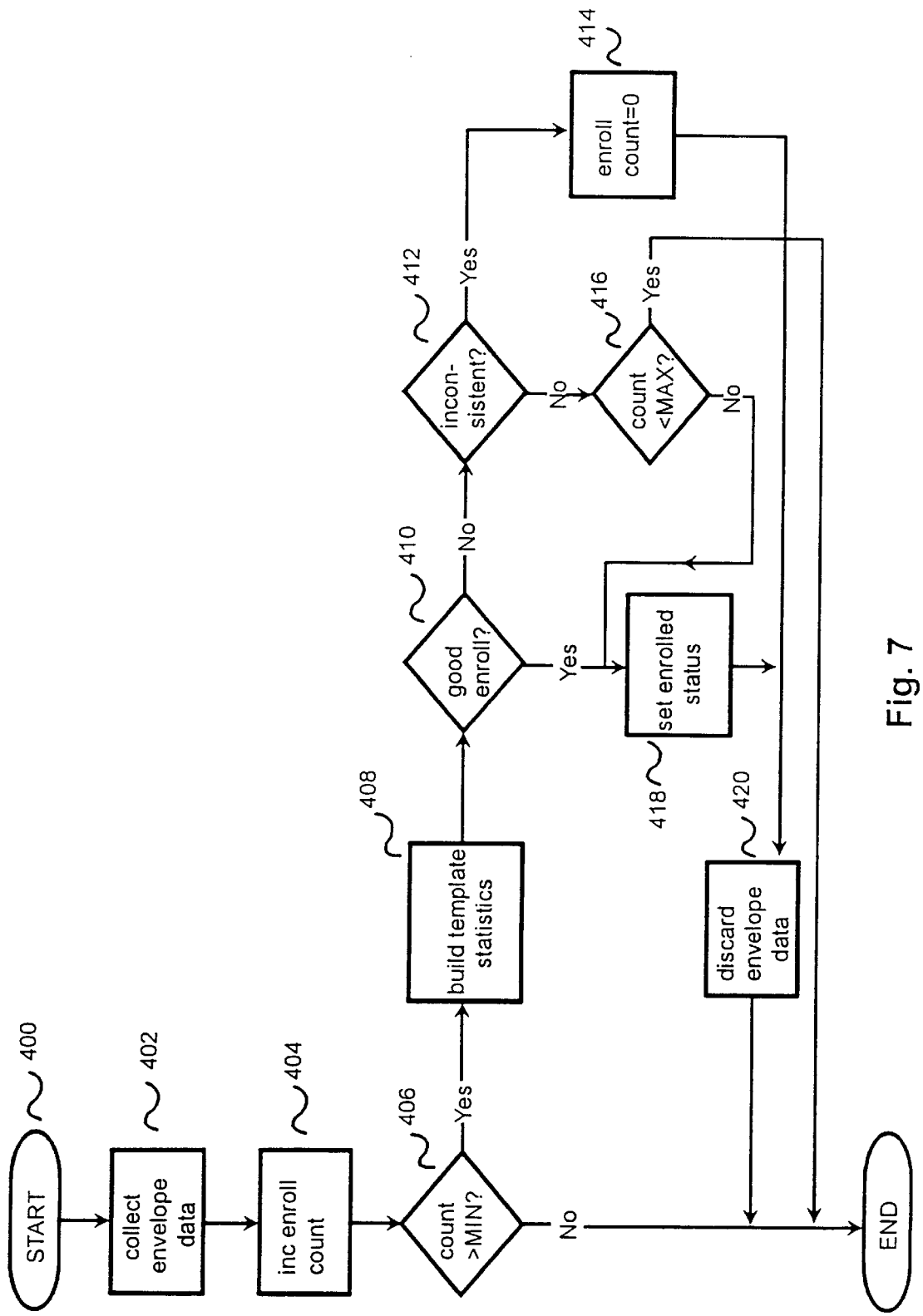
FIG. 7 is a flow chart illustrating typical steps in a template enrollment process.

Enroll (step 310)
The present invention permits template enrollment only when the template is in a non-enrolled condition.
The enrollment process is summarized in flow chart form in FIG. 7.
A pre-determined minimum of signatures must be submitted before the system of the present invention will attempt to complete the enrollment. Until this point is reached, data from the successive signature envelopes 10 are simply stored along with the inchoate template (step 402).
Once the minimum number of signature envelopes has been received (step 406), the present invention will perform certain checks to determine whether the signature envelopes submitted are consistent enough to generate a template. If not, all the signature envelopes are cleared and the template is reset to its initial state (steps 414 and 420). If, on the other hand, the signature envelopes submitted are consistent, then the template statistics are generated (step 408), the stored signature envelopes are dispensed-with and the template is marked as enrolled.

If, however, the minimum number of signature envelopes has been received and the template is susceptible of improvement (steps 416), then further signature envelopes up to a pre-determined maximum will be accepted. The most congruent set is retained until a good enrollment can be established or until the maximum is attained, whichever is sooner.

Import (step 304)
Previously-compiled template data is decrypted from a memory block and stored appropriately into the data structure.

Export (e.g. step 320)
The template data is encrypted into a memory block for archival or transmission to a remote system.

Verify (step 314)
The signature verification module 6 permits verification of a signature envelope 10 against a template only when the template is in an enrolled condition.

Measurements taken during the signature capture process and stored in the signature envelope 10 are compared against mean figures stored in the template. Account is taken of the variability of the user as observed during the enrollment process. Two figures are generated: one indicating the average error from the mean, and the other, the maximum divergence from the mean. Then, a function of these two values is used to generate a score in the range 0 . . . 100, where 0 indicates a mismatch and 100 a close match between the signature envelope and the template. This aspect of the signature verification module 6 is discussed in detail above.

When the client application supplies a signature envelope 10 for verification, it also supplies a score value which acts as a lower threshold for template update. Template update (or "bending")—see step 318—takes place subject to the following conditions:
the verification score is not less than the threshold;
the verification figures are neither too close nor too far from the mean;
the signature envelope 10 is more recent than the last signature envelope 10 verified;
the verification score is higher than the threshold value supplied by the client program 2.

If these conditions are met (at step 316), then a correction is applied to the means stored within the template, so that over time the template will accommodate itself to consistent drifts or trends in the signatory's performance. When update occurs, the template is time-stamped to facilitate the administration of multiple or remote copies of the template.

Clear (step 312)
The present invention can put the template into a condition in which it can be re-enrolled. The creation date/time is retained and the template update date/time is set to the current date/time.

Data Access (step 306)
Enrollment status
In response to an enquiry whether the template is enrolled, the system completes a block of information (as shown below) and this is made available for inspection by the client program 2.

In the representative embodiment, the block of information comprises:

update_time time the statistics were last updated
backup_time time the template was last backed-up
count number of signatures used to complete enrollment
enroll_status number indicating coherence of enrollment
enroll_flag non-zero if enrollment complete

3. The Template Database 12

A signature template is unique to an individual. Once a template has been constructed, it can be used to verify that person's identity, and to authenticate the documents the user signs using the system of the present invention. Clearly, a single individual's signature may be of interest to more than one client program 2 or indeed to more than one organization. The Template Database 12 is designed to make templates available to more than one application 2, and thus enable the "owner" of a template to gain a commercial advantage from the possession of an enrolled template by making it available to other clients for verification purposes.

The database architecture of the template database 12 supports these aims as follows:

Before using the database services, client applications 2 must identify themselves to the system of the present invention by means of a special identifier generated by the system.

The special identifier is generated when an application registers with the system of the present invention. Registration is required before a client application can create templates.

When a template is created, a database record containing the individual's name and a unique user identification number (which could be, for example, a national insurance number or a social security number) is also created and is henceforth unmodifiable. This record is used to support matching of client applications' different identifiers to the same individual.

The system of the present invention supports searching the template database 12 for any combination of matching data in order to support the correlation of an identity with a template.

Upon creation of a template, or upon matching with a specific search pattern, the system of the present invention provides the client application 2 with the ability to register that application's unique identifier for that individual; henceforth the client need only supply its preferred identifier. This recognizes the fact that client programs 2 will always have an index of unique identifiers referring to the individuals whose signatures are to be verified.

In the case that a client installation has appropriate license permissions, the system of the present invention will support the conversion of template records into an encrypted data block for separate archival or transmission.

The architecture of the present invention supports the novel concept of a signature verification bureau, offering a remote or networked verification service to any number of different clients 2.

It also supports the remote maintenance and administration of signature templates. This is of particular importance where templates built in a central location need to be distributed to remote processors for "off-line" verification independently of the central database. Examples include the use of smart cards, or of a "fleet" of small portable pen-operated computers, where centralized storage of signature templates may be essential in order to cope with failure of the equipment in the field and the rapid issuance of replacements with correct security configuration.

A purpose of a template database 12 is to store all the templates needed by an application program, e.g., 2b. However, the distinctive architecture of the database 12 aims to make individuals' templates available to more than one application, in such a way that different applications may be able to share a single template.

This is achieved by forcing client applications 2 to start a database session before any database functionality can become available. When the session is started, the client application 2 must declare its identity.

Figure 8:
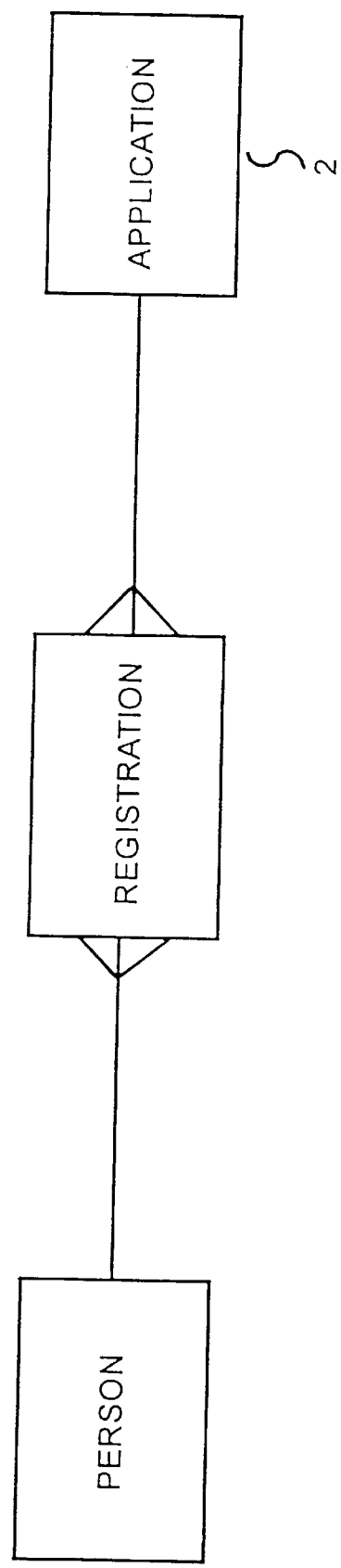
FIG. 8 is an entity relationship diagram of entities of the present invention.

The database 12 uses the concept of a person object to represent the template together with unique identifying information. All templates stored within the database 12 belong to persons, and any person may be registered with any application. Any one application may have many people registered with it, and any one person may be registered with several applications. This is illustrated by the Entity-relationship diagram in FIG. 8.

Initially, before any other database services become available, the client application 2 must make itself known to the system. When the application 2 starts the session, it declares a public name to describe itself, by which it will be known to all other applications. It also provides a secret encryption key. This key is used by the present invention to generate a unique ID for the application, known as an AID. At the same time, it also provides information as to the length of the unique identifier it proposes to use to identify persons when accessing their template.

When a client application 2 needs to create a template, it may first scan the database 12 for persons already registered with other applications. When a person is registered, a template is created and other information (surname, forename, middle names, user identification number) are also stored. Thus it is possible for the application using these criteria to determine if the person in question has already been registered with another application 2.

If no matching person has been discovered, a new person may be created and added to the database 12.

Figure 9:
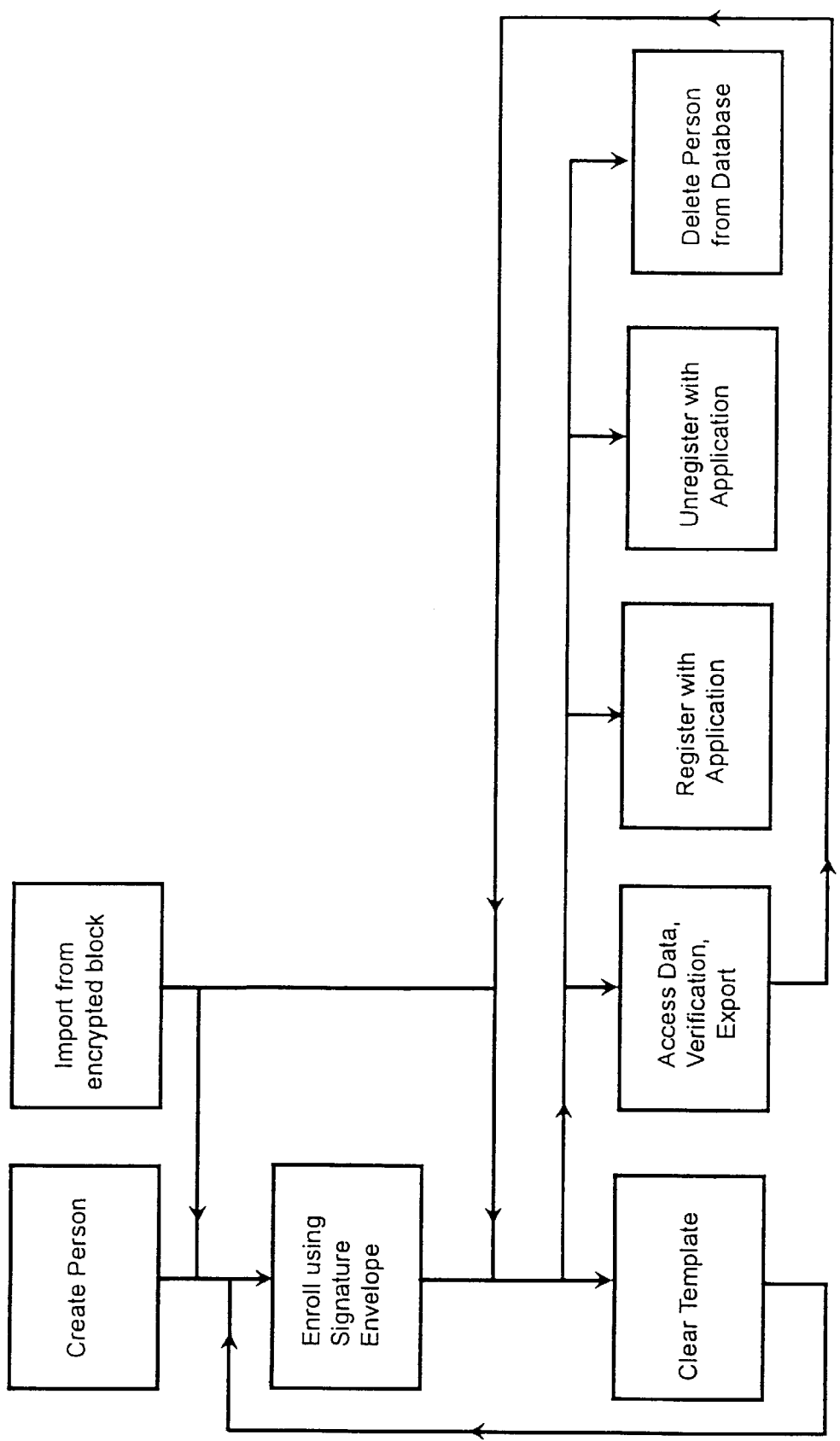
FIG. 9 is a diagram illustrating the life cycle of a software object representing a person.

In the representative embodiment, a person is represented by a software object. The life-cycle of this person software object is represented in FIG. 9. The database 12 performs all template operations on behalf of client applications 2 through operations upon the person object.

A person object, together with the corresponding template, is considered "owned" by the application 2 which creates it. Certain operations upon the template, including enrollment and clearing of the template, can be performed only by the owning application 2. However, the owning application may make enrollment available to other applications by specifying a password which the other application can use to unlock the template.

The name and unique user identification number associated with a person are used uniquely to identify that person across all applications. Consequently, these data are immutable.

Registration of a Person with an Application

Once a person has been created or located by an application 2, the application 2 may register that person with itself. This is achieved by providing that application's unique person-identifier (typically a unique key used by that application to identify that person). The length of the unique key is declared by the application 2 when it first registers with the database 12. This identifier is known as an Application's Unique Identifier (AUID). Thenceforth, the AUID will be used by that application to identify a person and/or his template.

At registration, the present invention constructs a new database record containing the AUID and cross-links the new record with any previous registrations by that application, and also with any previous registrations for that person by other applications.

An application may scan the database:
for all applications
for all persons registered with that application
for all persons not registered with that application
for all persons subject to matching criteria.

Figure 6:
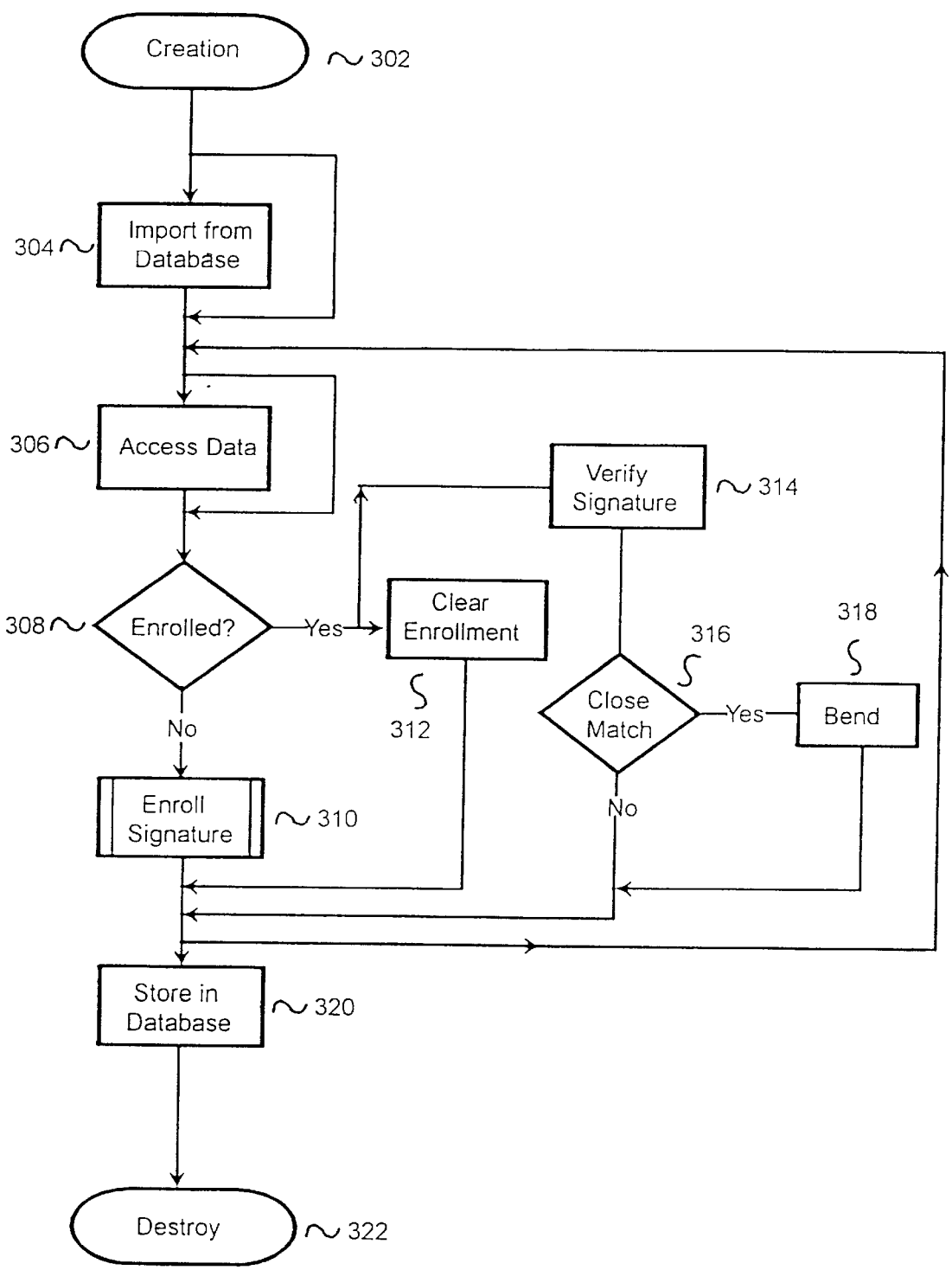
FIG. 6 is a flow chart illustrating a typical life-cycle for a template software object of the present invention.

The present invention will "modify" a signature template of an individual as the user's signature changes over time, as discussed at FIG. 6, step 318 above. For example, a signatory signs his name in more or less two seconds. This varies within about a tenth of a second, so the signature verification module 6 does not "mark him down" (i.e., does not decrease his signature match percentage) if the duration of his signature is, say, 2.1 or 1.9 seconds. But after a few months (perhaps out of familiarity with the equipment he is using), the user's signature tends towards the 1.9 second mark. Because all the other data are pretty much in line with his enrollment, the signature verification module 6 "bends" his signature template slightly to follow the pattern of change in his signing behavior. After a year, he is consistently signing at 1.8 seconds, sometimes 1.7, sometimes 1.9. By this time, the mean will have followed his behavior, so that it will now be set at 1.8. (If one of his original signatures as captured in a signature envelope 10 were now to be re-submitted, and it had a duration of 2.1 seconds, this might cause a fail to be reported.)

Software Objects

As stated above, the representative embodiment of the present invention is implemented using object orientated programming techniques. The following are representative objects used in the implementation of the present invention:

4.1 The Signature Envelope Object.

This is used to encapsulate the act of signature. Internally it uses the following sub-objects:

4.1.1 An object to represent the signature image. This contains the image data and methods to import and export such data; also to represent the data in bitmap form, or dynamically upon the display device.

4.1.2 An object to represent the act of signature itself, divorced from its context. This object contains the signature measures and subsidiary data concerning each individual pen-stroke. The primary purpose of this object is to represent the measures used by the verification function. This object in turn may relate to a temporary object used at the time of capture, which stores the raw pen data.

4.1.3 An object to represent the raw pen data and perform elementary analyses thereupon, e.g. number of strokes, number of points, etc., as well as to provide access to the raw pen data so that the object in 4.1.2 can generate the measures.

4.2 The signature template object.

This object contains the averages of the measures in the signature envelope 10, as well as the standard deviations of those measures. It possesses two major aspects of functionality, namely, the ability to "learn" or "enroll" from a set of signature envelopes, and secondly to perform a comparison after enrollment with a signature envelope 10—effectively, this is the verification function itself. It does not retain anything specifically related to any given signature envelope 10 except for the creation date and time of the most recently-signed envelope. This information is made available to the client application 2 so that it can determine if an out-of-sequence envelope is being verified.

4.3 The template database object.

This exists primarily to provide the client application 2 with a convenient means of storage, with encryption, of templates correlated with signatory IDs.

It contains two major sub-objects, these being:

4.3.1 An object which maintains basic information about people and cross-links this information with the applications which refer to them. It does this by maintaining a database of applications and a database of persons, together with two databases of links. One links each application to all the people to which it needs to make reference (this also contains the application's own specific ID for that person, as used at the time of character); the other links each person to all the applications which-refer to that person.

The primary goal of this object is thus to enable one person to be referred-to by a number of different applications in the way most suited to those applications' purposes.

4.3.2 An object which maintains the actual templates in a database indexed by a unique identifier—one per person.

Both these database objects use subsidiary objects to manage the types and organizations of files most appropriate to the specific task. For example, there are indexed-files, sequential files and linked-list files containing multiple sequences of items.

The architecture of the present invention can be utilized in the capture and verification of biometric information other than signatures. For example, the architecture of the present invention can be used to create and verify envelopes that comprise fingerprint information, eye pattern information and voice print information.

EXAMPLE

As stated above, in the representative embodiment of the present invention, the signature capture module 4 can create a checksum of the document that was signed. The document checksum can be used at a later date to verify that the document alleged to have been signed is the one that was signed, and further, that no change to that document has been made. In the representative embodiment, the document checksum is not a complete statement of the original document, and the original document cannot be derived from the document checksum. The document checksum bears a mathematical relationship to the document. If the document is changed, then it can no longer be mathematically matched with the checksum. This feature of the present invention can be called signature binding. The following is an example of the operation of the signature binding feature according to the present invention:

Given the following sample document:

"I am glad I was born in Borneo.<CR><LF>"

which equates to the following data in ASCII:

49 20 61 6D20 67 6C61 64 20 49 20 77 61 73 2062 6F72 6E20 69 6E20 42 6F72 6E65 6F2E0D0A

The checksum is generated using a message digest algorithm (such as, for example, the RSA MD4 or MD5 algorithm) to produce, for example, a document checksum (in hexadecimal) such as the following:

89F32145AB321AF7C411FB76543F0CFC.

A signature envelope contains the following information-
:version
version number (integer)
machine serial number (integer)
machine boot time (integer)
machine and operating system type (integer)
signatory's claimed ID (variable length, characters)
gravity prompt (variable length, characters)

signature measures sequence (integers)
date/time of signature (integer)
signature image (variable length)
file checksum (characters)
envelope checksum (characters)

When exported to an encrypted data block, this information would be supplemented with the following length information:

total length of the envelope (integer)
length of the signatory's claimed ID (integer)
length of the gravity prompt (integer)
length of the signature image (integer) (zero if no image)

In detail, the signature image is stored as follows:

Start co-ordinate
Sequence of differences between previous and next coordinate.

Each of these data items is composed in the following way:

If the next character, when seen as an integer, is negative, then the remaining bits in that character are used as flags to indicate the following conditions:

End of stroke
The next value is a two characters in length
The next-but-one value is two characters in length
The next value is changing sign (negative to positive or vice versa)
The next-but-one value is changing sign
The next value is a repeat count (always positive)

For example, if a signature began with a geometrically accurate letter 'V', the image would be represented as follows:

1. Positive character giving Y co-ordinate of 20
2. Zero character giving X co-ordinate of 0
3. Negative character with bit set to indicate repeat count
4. Character with value 10
5. Negative character with bit set to indicate Y going negative
6. Positive character giving Y difference of 2 (i.e. −2)
7. Positive character giving X difference of 1
8. Negative character with bit set to indicate repeat count
9. Character with value 10
10. Negative character with bit set to indicate Y going positive
11. Character giving Y difference of 2 (now +2)
12. Character giving X difference of 1
13. Negative character with bit set to indicate end-of-stroke.

Suppose that an client application 2 wishes to capture a signature and wishes to attach the signature to the Borneo document. Under the OS/2 operating system, it will prepare the following information:

The OS/2 identifier for the window (e.g. 30 of FIG. 3A) into which the signature capture window 20 will be inserted;
a zero-terminated sequence of characters identifying the signatory;
a zero-terminated sequence of characters giving the gravity prompt;
an integer with a non-zero value if it is desired that an image of the signature be captured;
a sequence of characters giving the client application's secret key for the integrity checksum;
an integer giving the length of the secret key;
a zero-terminated sequence of characters giving the name of the file in which the document to be checksummed is stored.

The signature capture component will then display the signature capture window 20 bearing the appropriate gravity prompt 22 and the claimed ID of the signatory. It will also traverse the designated file and generate the checksum. While the user moves the pen over the signature capture window 20, the pen data are stored internally in the form of X and Y movement values and time-differences. If the user then activates the "OK" control 28, these movement values are scaled to represent absolute distances and are then analyzed to yield the signature measures. Finally, if an image of the signature was requested, the pen data are converted to the image sequence (all timing information is discarded).

At this point, the client application 2 is informed of the outcome of the interaction by means of a numeric code:

0. Envelope successfully created
1. Signature was abandoned—user activated "Cancel" control
3. Invalid (e.g. zero-length) claimed ID
4. Invalid (e.g. zero-length) gravity prompt
5. Error reading the file which was to have been checksummed.

What is claimed is:

1. A computer-based method for verification of a handwritten signature that relates to a document, comprising the steps of:
    at a first computer processor, signing a document by electronically capturing a handwritten signature of a signatory;
    at the first computer processor, storing in a signature envelope a visual representation of the handwritten signature;
    at the first computer processor, creating a checksum of the document;
    at the first computer processor, storing the checksum in the signature envelope;
    at the first computer processor, storing in the signature envelope a claimed identity of the signatory;
    at the first computer processor, encrypting the signature envelope to create an encrypted signature envelope; and
    providing the encrypted signature envelope to a second computer processor.

2. The method of claim 1 further comprising the steps of:
    at the second computer processor, decrypting the encrypted signature envelope;
    at the second processor, creating a second checksum of an electronic document; and
    comparing the second checksum to the checksum stored in the signature envelope to determine if the electronic document is a true representation of the document that was signed at the first computer processor.

3. The method of claim 1 further comprising the step of, at the first computer processor, creating an integrity checksum of the signature envelope and storing in the integrity checksum in the signature envelope prior to encryption of the signature envelope.

4. The method of claim 3 further comprising the step of, at the second computer processor, decrypting the encrypted signature envelope and utilizing the integrity checksum to determine if the signature envelope has been modified.

5. The method of claim 1 further comprising the step of electronically displaying an image of the document at the first computer processor.

6. The method of claim 1 further comprising the steps of electronically displaying a prompt summarizing the first document and storing the prompt in the signature envelope.

7. The method of claim 6 further comprising the steps of:
    at the second computer processor, decrypting the encrypted signature envelope; and at the second computer processor, retrieving the prompt from the signature envelope.

8. The method of claim 6 wherein the prompt summarizing the first document displays an indication of an importance of the first document and the indication includes an amount of money.

9. The method of claim 1 further comprising the steps of electronically displaying a prompt which indicates the importance of the document and storing the prompt in the signature envelope.

10. The method of claim 8 wherein the document evidences a transaction in which an amount of money is to be exchanged and the indication of the importance of the document includes an amount of money of the transaction.

11. A computer-based method for verification of a handwritten signature that relates to a document, comprising the steps of:

signing a document by electronically capturing a handwritten signature of a signatory;

storing in a signature envelope a visual representation of the handwritten signature;

creating a checksum of the document;

storing the checksum in the signature envelope;

storing in the signature envelope a claimed identity of the signatory; and encrypting the signature envelope to create an encrypted signature envelope.

12. The method of claim 11 further comprising the steps of:

decrypting the encrypted signature envelope;

creating a second checksum of an electronic document; and comparing the second checksum to the checksum stored in the signature envelope to determine if the electronic document is a true representation of the document that was signed.

13. The method of claim 11 further comprising the steps of:

decrypting the encrypted signature envelope;

retrieving a signature template of a person having the claimed identity as stored in the signature envelope, the signature template comprising information relating to one or more genuine handwritten signatures of said person; and comparing the information stored in the signature template with the electronically captured handwritten signature as stored in the signature envelope to obtain a similarity score representative of a degree of similarity between the handwritten signature captured upon signing the document and the one or more genuine handwritten signatures.

14. The method of claim 13 further comprising the steps of:

creating a second checksum of an electronic document; and comparing the second checksum to the checksum stored in the signature envelope to determine if the electronic document is a true representation of the document that was signed.

15. The method of claim 11 further comprising the step of outputting the visual image of the handwritten signature.

16. The method of claim 11 further comprising the steps of electronically displaying a prompt which indicates the importance of the document and storing the prompt in the signature envelope.

17. The method of claim 16 wherein the document evidences a transaction in which an amount of money is to be exchanged and the indication of the importance of the document includes the amount of money of the transaction.

18. A computer-implemented biometrics authentication method, comprising the steps of:

displaying a gravity prompt;

capturing biometrics information;

analyzing the biometrics information to obtain measurements relating to the biometrics information;

storing said measurements and said gravity prompt in an envelope;

encrypting the envelope;

decrypting the envelope; and comparing said measurements with a set of statistics of genuine biometrics information to obtain a similarity score.

19. The method of claim 18 further comprising the step of outputting the stored gravity prompt.

20. The method of claim 18 wherein the step of displaying the gravity prompt displays a gravity prompt indicating a specific amount of money.

21. The method of claim 20 comprising the further step of:

comparing a biometric comparison success value, that is based on the amount of money displayed by the gravity prompt against the similarity score to determine the success or failure of the biometrics authentication.

22. The method of claim 18 where the biometrics information captured in the capturing step is voice print information and the genuine biometrics information in the comparing step is voice print information.

23. The method of claim 18 where the biometrics information captured in the capturing step is eye pattern information and the genuine biometrics information in the comparing step is eye pattern information.

24. The method of claim 18 where the biometrics information captured in the capturing step is fingerprint information and the genuine biometrics information in the comparing step is fingerprint information.

25. The method of claim 18 where the biometrics information captured in the capturing step is handwritten signature information and the genuine biometrics information in the comparing step is handwritten signature information.

26. A computer-based method for verification of a biometrics information that is related to a document, comprising the steps of:

at a first computer processor, approving a document by electronically capturing biometric information of a user;

at the first computer processor, storing in an envelope a set of measurements relating to the biometric information;

at the first computer processor, creating a checksum of the document;

at the first computer processor, storing the checksum in the envelope;

at the first computer processor, storing in the envelope a claimed identity of the user;

at the first computer processor, encrypting the envelope to create an encrypted envelope; and providing the encrypted envelope to a second computer processor.

27. The method of claim 26 further comprising the steps of:

at the second computer processor, decrypting the encrypted envelope;

at the second computer processor, retrieving a set of statistics relating to genuine biometrics information of a person having the claimed identity as stored in the envelope; and at the second computer processor, comparing the set of statistics with the set of measurements stored in the envelope to obtain a similarity score.

28. The method of claim 27 further comprising the steps of:

at the second processor, creating a second checksum of an electronic document; and comparing the second checksum to the checksum stored in the envelope to determine if the electronic document is a true representation of the document that was approved at the first computer processor.

29. The method of claim 27 further comprising the step of providing the similarity score to the first computer processor.

30. The method of claim 26 further comprising the steps of:

at the second processor, creating a second checksum of an electronic document;

at the second computer processor, decrypting the encrypted envelope; and comparing the second checksum to the checksum stored in the envelope to determine if the electronic document is a true representation of the document that was approved at the first computer processor.

31. The method of claim 26 further comprising the steps of:

at the first computer electronically displaying a prompt which indicates the importance of the document where the document evidences a transaction for the exchange of an amount of money and the prompt indicates the amount of money involved in the transaction; and at the first computer storing the prompt in the envelope.

32. The method of claim 31 further comprising the steps of:

at the second computer processor, decrypting the encrypted envelope;

at the second computer processor, retrieving a set of statistics relating to genuine biometrics information of a person having the claimed identity as stored in the envelope;

at the second computer processor, comparing the set of statistics with the set of measurements stored in the envelope to obtain a similarity score; and at the second computer, comparing a biometrics comparison success value that is based on the amount of money displayed by the prompt against the similarity score to determine the success or failure of the verification of the biometrics information.

33. The method of claim 26 where the biometrics information captured in the capturing step is voice print information and the genuine biometrics information in the comparing step is voice print information.

34. The method of claim 26 where the biometrics information captured in the capturing step is eye pattern information and the genuine biometrics information in the comparing step is eye pattern information.

35. The method of claim 26 where the biometrics information captured in the capturing step is fingerprint information and the genuine biometrics information in the comparing step is fingerprint information.

36. The method of claim 26 where the biometrics information captured in the capturing step is handwritten signature information and the genuine biometrics information in the company step is handwritten signature information.

* * * * *